United States Patent [19]

Martin et al.

[11] Patent Number: 4,949,524
[45] Date of Patent: Aug. 21, 1990

[54] FLANGE FINISHER WITH WEATHERSTRIP

[75] Inventors: Richard D. Martin; Roger D. Smith, both of Stratford, Canada

[73] Assignee: The Standard Products Company, Cleveland, Ohio

[21] Appl. No.: 304,872

[22] Filed: Jan. 30, 1989

Related U.S. Application Data

[63] Continuation of Ser. No. 98,006, Sep. 16, 1987, abandoned.

[51] Int. Cl.$^5$ .............................................. E04C 2/38
[52] U.S. Cl. ..................................... 52/716; 52/400; 49/490
[58] Field of Search .................... 52/400, 716, 717; 49/490, 491

[56] References Cited

U.S. PATENT DOCUMENTS

| | | | |
|---|---|---|---|
| 4,103,459 | 8/1978 | Barnerias et al. | 49/491 |
| 4,105,814 | 8/1978 | Eggert | 52/716 X |
| 4,143,497 | 3/1979 | Offenbecher | 52/400 |
| 4,232,081 | 11/1980 | Pullan | 52/716 X |
| 4,348,443 | 9/1982 | Hein | 52/716 X |
| 4,411,941 | 10/1983 | Azzola | 52/716 X |
| 4,447,065 | 5/1984 | Dupuy et al. | 52/400 X |
| 4,787,668 | 11/1988 | Kawase et al. | 52/400 |

FOREIGN PATENT DOCUMENTS 2006309  5/1979  United Kingdom ................ 49/490

Primary Examiner—Carl D. Friedman
Attorney, Agent, or Firm—Harness, Dickey & Pierce

[57] ABSTRACT

A flange finisher particularly well adapted for attachment to a flange of a motor vehicle as a pair of side walls joined by a web portion to form a U-shaped channel. Extending from one side wall into the channel are a plurality of small ribs. Extending from the other side wall into the channel and in opposition to the small ribs is a long foot wall which carries a plurality of ridges.

5 Claims, 1 Drawing Sheet

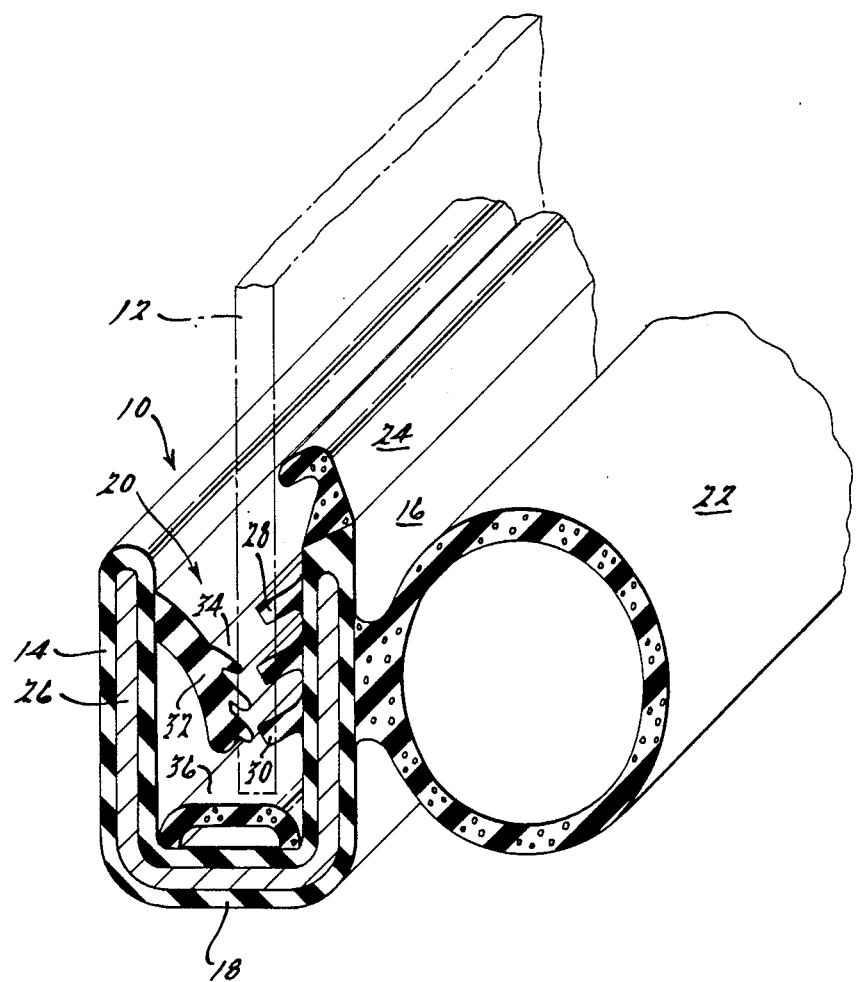

FLANGE FINISHER WITH WEATHERSTRIP

This is a continuation of U.S. patent application Ser. No. 098,006, filed Sept. 16, 1987 now abandoned.

BACKGROUND AND SUMMARY OF THE INVENTION

The present invention relates to a strip structure intended to be attached to a flange, for example a flange on a motor vehicle. More particularly the present relates to a flange finisher intended to be attached to a flange on a motor vehicle and having a weatherstrip for the purpose of sealing.

Flange finishers for use in the automotive industry are well known. Flange finishers are employed to protect, seal and provide a more pleasing appearance to the edges of flanges, pinchwelds and the like such as are often found on automotive vehicle bodies and protective head gear. Flange finishers are also used to support a weatherstrip to seal doors, windows, trunk lids and so forth in automotive vehicles. Flange finishers generally have a U-shaped body comprising a web region joining two sidewall regions to form a U-shaped channel with a plurality of ribs extending from each side region toward the interior of the channel. The ribs are adapted to grip an associated flange edge when the flange finisher is forced thereon. Examples of flange finishers are taught in U.S. Pat. Nos. 4,188,765 Feb. 19, 1980 to Jackson; 4,092,813 June 6, 1978 to Eggert; 4,318,249 Mar. 9, 1982 to Landreth; 4,324,826 Apr. 13, 1982 to Ginster; and 4,348,443 Sept. 7, 1982 to Hein.

Although flange finishers are known in the art there remains a need for flange finishers which are improved with respect to ease of installation and resistance to removal. Ideally, a flange finisher would require little force for installation and yet, once installed, would be securely retained onto the flange edge and strongly resistant to removal from the flange edge. Thus, in accordance with the present invention a flange finisher is provided which can be fitted to a flange without undue force and yet has increased resistance to removal from the flange once fitted thereon. A flange finisher of the present invention has a pair of side walls joined by a web portion to form a U-shaped channel. Extending from one side wall into the channel are a plurality of small ribs. Extending from the other side wall into the channel and in opposition to the small ribs is a long foot wall which carries a plurality of ridges. Further understanding of the present invention will be had from the following disclosure.

BRIEF DESCRIPTION OF THE DRAWING

The FIGURE is a perspective view, in section and broken away, of a flange finisher of the present invention.

DESCRIPTION OF THE INVENTION

Now referring to the drawing, the FIGURE shows a preferred embodiment of a flange finisher of the present invention which is indicated generally by the numeral 10. Flange finisher 10 is intended to clampingly engage the edge of a flange such as flange 12 shown in broken lines in the FIGURE.

Flange finisher 10 has sidewalls 14 and 16, the edge portions of which are joined by web 18 to form a channel 20. Flange finisher 10 can include an associated sealing bubble 22 and sealing finger 24 which are preferably made of sponge rubber, for example, EPDM. Flange finisher 10 preferably has a metal core 26 which can be any metal carrier or core conventional in the art, suitable cores are disclosed, for example, in U.S. Pat. Nos. 3,165,793 Jan. 19, 1965 to Lynch, 3,167,825 Feb. 2, 1965 to Zoller and 4,339,860 July 20, 1982 to Hayashi. The flange finisher 10 of the present invention can be made by extruding EPDM or other rubber cover material over a flat metal core and then forming into the U-shape as is illustrated in the drawing. Alternatively, the core may be eliminated from flange finisher 10 if the cover material is of sufficient strength such as EPDM of 40 to 60 shore D durometer.

Projecting inwardly from sidewall 16 are a plurality of short ribs 28. Ribs 28 preferably have squared ends 30 and extend at an angle from side wall 16, extending both toward the interior of channel 20 and toward web 18. Ribs 28 are relatively short, extending less than half the width of channel 20.

Projecting inwardly from sidewall 14 is a long foot 32. Foot 32 extends at an angle from sidewall 14, extending both toward the interior of channel 20 and toward web 18. Foot 32 is of a length greater than ribs 28 and preferably has a length greater than half the width of channel 20. The side of foot 32 generally facing the open mouth of channel 20 carries a plurality of ridges 34 which are adapted to abut against flange 12 when flange finisher 10 is installed thereon. Also located within channel 20 is a foam rubber seal 36 which runs along web 18.

The foam rubber seal 36 includes a pair of lateral ends spanning the web 18 such that the lateral ends are joined at the junction of the side walls 14 and 16 and web 18. A cavity is formed between the sponge rubber seal 36 and the web 18. The sponge rubber seal 36 is adapted to seal with the flange 12.

Flange finisher 10 can be easily installed onto a flange and has the flexibility to accommodate large variances in flange thicknesses. Flange finisher 10 is especially suitable for use in connection with automotive vehicle door or trunk sealing applications.

While a specific embodiment of this invention has been described and illustrated herein it is to be understood may be varied within the scope of the appended claims without departing from the spirit of the invention.

What is claimed is:

1. A flange finisher having a pair of side walls joined by a web to form a U-shaped channel, a plurality of relatively short ribs extending into said channel from one of said pair of side walls, sealing means having a hook configuration extending from one of said side walls such that said sealing means extends above said U-shaped channel and said hook end is adapted to contact and seal a member received in said U-shaped channel, a second sealing means in said U-shaped channel, said second sealing means comprised of a sponge rubber member having a pair of lateral ends spanning said web such that said lateral ends are joined at the junction of said side wall and web so that a cavity is formed between said member and said web, said sponge rubber member adapted to seal with said flange and a relatively long foot with a plurality of ridges thereon extending into said channel from the other of said pair of side walls.

2. A flange finisher as in claim 1 wherein said sidewalls and web comprise a metal core having a rubber cover thereover.

3. A flange finisher as in claim 2 wherein one of said sidewalls has a sealing bubble attached thereto extending away from said channel.

4. A flange finisher having a pair of side walls joined by a web to form a U-shaped channel, one or more relatively short ribs extending into said channel from one of said pair of side walls, said one or more ribs having squared ends, a sealing finger having a hook shape extending from one of said side walls such that said sealing finger hook end extends over said U-shaped channel and is adapted to contact a flange inserted into said U-shaped channel, a second sealing means in said U-shaped channel, said second sealing means comprised of a sponge rubber member having a pair of lateral ends spanning said web such that said lateral ends are joined at the junction of said side wall and web so that a cavity is formed between said member and said web, said sponge rubber member adapted to seal with said flange and a relatively long foot with a plurality of ridges thereon extending into said channel from the other of said pair of side walls.

5. A flange finisher having a pair of side walls joined by a web forming a U-shaped channel, said side walls defining a pair of planes substantially parallel to one another and said web defining a plane substantially perpendicular to said side walls, a plurality of relatively short ribs extending into said channel from one of said pair of side walls, a sealing finger extending from one of said side walls such that said sealing finger is substantially coplanar with the plane defined by said side wall and an end portion of said sealing finger extending in a plane over said channel substantially perpendicular to said side wall plane, a second sealing means in said U-shaped channel, said second sealing means comprised of a sponge rubber member having a pair of lateral ends spanning said web such that said lateral ends are joined at the junction of said side wall and web so that a cavity is formed between said member and said web, said sponge rubber member adapted to seal with said flange and a relatively long foot with a plurality of ridges thereon extending into said channel from the other of said pair of side walls.

* * * * *